(12) United States Patent
Rinaldi

(10) Patent No.: US 12,307,436 B2
(45) Date of Patent: May 20, 2025

(54) GIFT CARD WITH BALANCE INDICATOR PANELS

(71) Applicant: Robert C. Rinaldi, Bakersfield, CA (US)

(72) Inventor: Robert C. Rinaldi, Bakersfield, CA (US)

( * ) Notice: Subject to any disclaimer, the term of this patent is extended or adjusted under 35 U.S.C. 154(b) by 927 days.

(21) Appl. No.: 17/304,017

(22) Filed: Jun. 12, 2021

(65) Prior Publication Data

US 2022/0012715 A1     Jan. 13, 2022

Related U.S. Application Data

(63) Continuation of application No. 14/788,898, filed on Jul. 1, 2015, now Pat. No. 11,037,135, which is a continuation-in-part of application No. 14/155,351, filed on Jan. 14, 2014, now abandoned.

(60) Provisional application No. 61/848,911, filed on Jan. 14, 2013.

(51) Int. Cl.
    *G06Q 20/32*     (2012.01)
    *G06Q 20/28*     (2012.01)
    *G06Q 20/34*     (2012.01)
    *G07F 7/08*     (2006.01)
    *G09F 1/02*     (2006.01)

(52) U.S. Cl.
    CPC .......... *G06Q 20/342* (2013.01); *G06Q 20/28* (2013.01); *G06Q 20/347* (2013.01); *G06Q 20/352* (2013.01); *G07F 7/086* (2013.01); *G09F 1/02* (2013.01)

(58) Field of Classification Search
CPC ...... G06Q 20/10; G06Q 20/28; G06Q 20/102; G06Q 20/105; G06Q 20/342; G06Q 20/347; G06Q 20/352
USPC ...................................... 705/39–42
See application file for complete search history.

(56) References Cited

U.S. PATENT DOCUMENTS

| | | | |
|---|---|---|---|
| 4,344,996 A | 8/1982 | Banks | |
| 6,204,900 B1 | 3/2001 | Fegason | |
| 7,284,708 B2 * | 10/2007 | Martin | G06K 19/07703 349/86 |
| 7,440,771 B2 | 10/2008 | Purk | |
| 7,798,318 B2 * | 9/2010 | Dwyre | B44D 2/002 206/223 |

(Continued)

OTHER PUBLICATIONS

Cybermoola: "Teen Buyers Now Have New Ways to Pay Online," Computerworld, Oct. 25, 1999, v33n43p40; Dialog file 15 #01950645, 3pgs.

(Continued)

*Primary Examiner* — Hani M Kazimi

(74) *Attorney, Agent, or Firm* — Gary L. Eastman, Esq.; Eastman IP

(57) ABSTRACT

A gift card includes a card body having a retailer's or credit card company name and logo, a pre-printed gift card account balance representing the balance on the card when initially purchased, and a user-fillable Card Balance data field which can be completed using an ordinary pencil or pen. The gift card also may be printed with one or more prompts, such as a graphic or written instruction, to provide a user with sufficient instruction to use the re-writable functionality of the present invention, and may include dollar and cents indicators to facilitate a user to write the current and updated balance clearly and accurately.

14 Claims, 7 Drawing Sheets

(56) References Cited

U.S. PATENT DOCUMENTS

| | | |
|---|---|---|
| 8,261,998 B2 | 9/2012 | Roncari |
| 8,600,863 B2 | 12/2013 | Jair |
| 8,893,966 B2 | 11/2014 | Wilen |
| 8,977,567 B2 | 3/2015 | Aabye |
| 2002/0076224 A1* | 6/2002 | Pollocks, Jr. ...... G03G 21/1892 399/12 |
| 2003/0107639 A1 | 6/2003 | Field |
| 2003/0200179 A1* | 10/2003 | Kwan ................. G06Q 20/385 705/65 |
| 2009/0068624 A1 | 3/2009 | Schulken |
| 2010/0151159 A1 | 6/2010 | Beck |
| 2010/0299194 A1 | 11/2010 | Snyder |
| 2011/0101111 A1 | 5/2011 | Roncari |
| 2011/0106698 A1 | 5/2011 | Isaacson |
| 2011/0153462 A1* | 6/2011 | Granich ............. G06Q 30/0601 705/41 |
| 2012/0031545 A1 | 2/2012 | Vaccaro |
| 2012/0150643 A1 | 6/2012 | Wolfe |
| 2012/0234912 A1* | 9/2012 | Yankovich ............ G06Q 20/28 705/41 |
| 2013/0024372 A1 | 1/2013 | Spodak |
| 2013/0056539 A1 | 3/2013 | Iwaloye |

OTHER PUBLICATIONS

ICanBuy: "Internet Marketers Offer Kids Online Sales Access," Card Marketing, Jun. 1999, v3n6p1; Dialog file 9 #01882956, 3pgs.

* cited by examiner

GIFT CARD WITH BALANCE INDICATOR PANELS

RELATED APPLICATIONS

The present application is a continuation of U.S. Utility patent application Ser. No. 14/788,898 entitled "Gift Card With Balance Indicators Panels" filed Jul. 1, 2015, which is a continuation in part of U.S. Utility patent application Ser. No. 14/155,351 entitled "Gift Card With Balance Indicator Panel" filed Jan. 14, 2014, which in turn claims the benefit of priority to U.S. Provisional Patent Application Ser. No. 61/848,911, entitled "Gift Card With Hand Writable and Erasable Current Balance Including A Printed Prompt To Do So", filed Jan. 14, 2013. The entirety of the aforementioned applications are incorporated herein by reference.

FIELD OF THE INVENTION

The present invention relates generally to gift cards and prepaid reloadable credit cards. The present invention is more particularly, though not exclusively, useful as a gift card that provides the user with a user-modifiable balance field that allows for the update of the card account balance during use.

BACKGROUND OF THE INVENTION

Gift cards have become increasingly popular over the past decade. As gift-giving gets more complicated, many consumers have opted for giving gift cards so that the recipients can purchase their preferred gifts. This trend has resulted in most retailers offering a gift card to their customers, and allows those customers to purchase gift cards of various pre-determined denominations, or by a purchaser-selected denomination. For instance, many retailers offer gift cards of pre-determined values, such as $10, $20, $50, etc. Alternatively, a gift card can be created for virtually any denomination, such as a particular monetary value as selected by the purchaser.

As gift cards have become more popular, it has been commonplace for consumers to carry more than one gift card in their wallet or purse. As a result of these multiple gift cards, it is often difficult if not impossible to remember the account balance for each card. Even though retailers often provide a consumer with a receipt bearing the current balance following a transaction, keeping track of those multiple receipts often proves difficult, resulting in consumers losing track of their account balances on the various gift cards.

It has also become apparent that customers often hesitate to use gift cards when the balance available on the card is uncertain. Indeed, there are few things more embarrassing than presenting a gift card only to have it denied as insufficient for the transaction. As a result, retailers often secure significant benefit from unused gift cards. Indeed, when a consumer fails to exhaust the balance on a gift card, the retailer issuing the card receives a windfall—pure profit from the remaining gift card balance. In fact, some retailers even charge a monthly service fee for gift cards which, after a period of non-use, results in the entire balance on the gift card being absorbed by these fees rendering the gift card valueless to the consumer.

In light of the above, it would be advantageous to provide a gift card which provides a user with the ability to easily and accurately track the balance on a gift card. It would also be advantageous to provide a gift card that can be easily updated by a retailer without substantive modification to the gift card, or the necessity to print paper receipts for to memorialize post-transaction balances. Because the customer is not losing any money on the gift card, the retailer may ultimately benefit as this aspect makes the card more user-friendly. A more user-friendly card generates increased card sales for the retailer.

SUMMARY OF THE INVENTION

The present invention provides the means to record the initial or remaining value on a gift card. The characters "Card Balance: $_____._____" or the like will be printed on the card. Also, the characters "(pencil)" or the like will be printed on the card to indicate that a pencil or other erasable medium should be used to write on the card. The gift card purchaser or merchant may write the initial or current value of the card with pencil or erasable pen. During the next use of the gift card the card purchaser or merchant may erase the previous value with a pencil or erasable pen eraser and write the new value after the card's use and so on. The material that will be written on with a pencil or erasable pen may be the same type of material that is used for signing the back of credit cards or any material that can be written on. Said material and prompt can be placed on the front or back of the gift card.

People give and receive many gift cards and never seem to know how much money the gift card is worth after its initial use. People may call an 800 phone number and enter the gift card's serial number or go to the internet and retrieve the gift card's current value. The current invention teaches a much simpler way of knowing the gift's card value by simply recording the current value on the gift card when the card is initially purchased or subsequently used. Merchants usually print a receipt with the remaining value on the gift card at the time of use. The merchant or purchaser may simply erase the prior value written in pencil or erasable pen with the appropriate eraser and the write the remaining value on the card for future reference.

People may buy more gift cards when they see the remaining value of their card, and it gives the card's value more creditability. This concept may be used with all types of gift cards including, but not limited to, gift cards offered by any and all retail establishments and gift cards offered by any and all credit card companies including American Express, Visa, Discover Card and MasterCard, as well as re-loadable credit cards.

This idea is unlike another patent application titled "Real-time card Balance on card plastic" (EP 2203883 A1). The idea describes a prepaid payment card that electronically displays the card's balance when a button is pressed. The card uses a computer to retrieve and translate an encoded notation of the balance that is printed on the card. Remote terminals may be configured to support the real-time display of a balance on a prepaid payment card by writing the current balance to the card after a payment transaction has occurred.

The gift card of the present invention has a written prompt and balance, is cheaper to manufacture and less complicated than one that uses an electronic display which requires an electronic source or internal battery, or alternative energy source, such as solar. With the written prompt-based card of the present invention, the purchaser or merchant simply writes the current balance on the card after erasing the prior balance and writing in the new balance with an erasable writing instrument in the indicated area.

A system for recording the current value of a gift card utilizes printed prompts that are an integral part of the gift card which prompt the gift card user to write and erase the value and subsequent values of the gift.

In an alternative embodiment of the present invention, a gift card includes a number of user-modifiable data field intended to provide a user with a user-fillable field for use in tracking the balance associated with the gift card during its lifetime of use. This embodiment includes a first data field in which a user writes a starting balance. As the gift card is used, the user strikes-through the prior balance with a pen or pencil, and writes the then-current balance in an adjacent data field. This process is repeated as the card is continually used, thus providing a user with a fast and accurate method of tracking the gift card balance available, and facilitating use of the entire account balance associated with the gift card.

Each data field in this alternative embodiment includes a coating receptive to pen or pencil to provide a user with the ease of writing the current balance in the data field. This coating resists erasure and smearing and thus will provide the user with an accurate balance despite the gift card being stored in a wallet or purse where it may be rubbed, scratched, or subject to other environmental hazards.

BRIEF DESCRIPTION OF THE DRAWING

The nature, objects, and advantages of the present invention will become more apparent to those skilled in the art after considering the following detailed description in connection with the accompanying drawings, in which like reference numerals designate like parts throughout, and wherein.

DETAILED DESCRIPTION OF A PREFERRED EMBODIMENT

Gift Card

Figure 1:
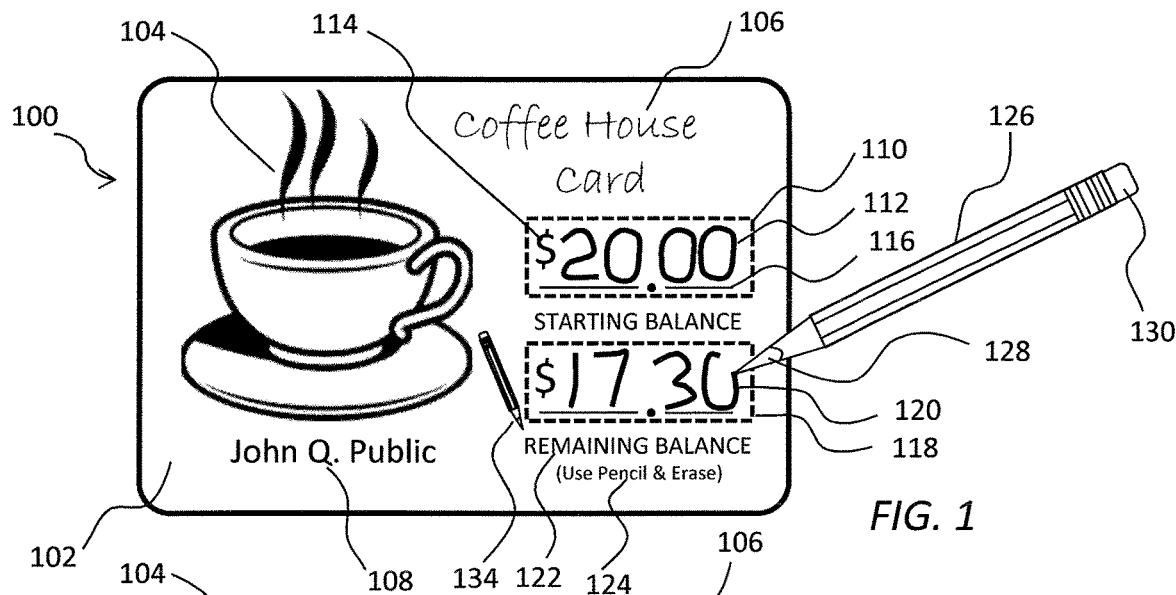
FIG. 1 is a front view of a gift card of the present invention showing the retailer's logo, the name of the customer, a starting balance data field, a remaining balance data field, and showing the erasability of the data fields using an ordinary pencil.

Referring initially to FIG. 1, a front view of a gift card of the present invention is shown and generally designated 100. Gift card 100 includes a card body 102 printed with a customer logo or design 104 and a card name indicating the source of the card, such as "Coffee House Card" 106. In a preferred embodiment, a gift card 100 can be personalized with a customer's name 108.

Gift card 100 includes a starting balance data field 110 having an erasable writing surface to allow the writing of a starting balance 112, and may include one or more prompts, such as a pre-printed currency indicator 114, and a dollars and cents indicator 116 to facilitate the user's correct completion of the data field 110. The term "prompt" as used herein means any visual indicator which is intended to prompt the user to complete a particular data field, such as the currency indicator 114, and the dollars and cents indicator 116. The term "user" as used herein means anyone using the card, including but not limited to retailers, customers, gift card recipients, and cashiers. There is no distinction between each user as to their ability to complete or modify the data field 110.

A remaining balance data field 118 is also provided and allows the user to include a hand-written remaining balance 120 that can be written using for example, a pencil 126 with a lead 128 and an eraser 130. Data field 118 may be written, erased and re-written many times during the life of the gift card 100.

Gift card 100 may also include a prompt including for example an image of an erasable writing device, such as image 134 of a pencil, and may also include instructions to the user, such as "(Use Pencil & Erase)" 124 adjacent the data fields 110 and 118.

Figure 2:
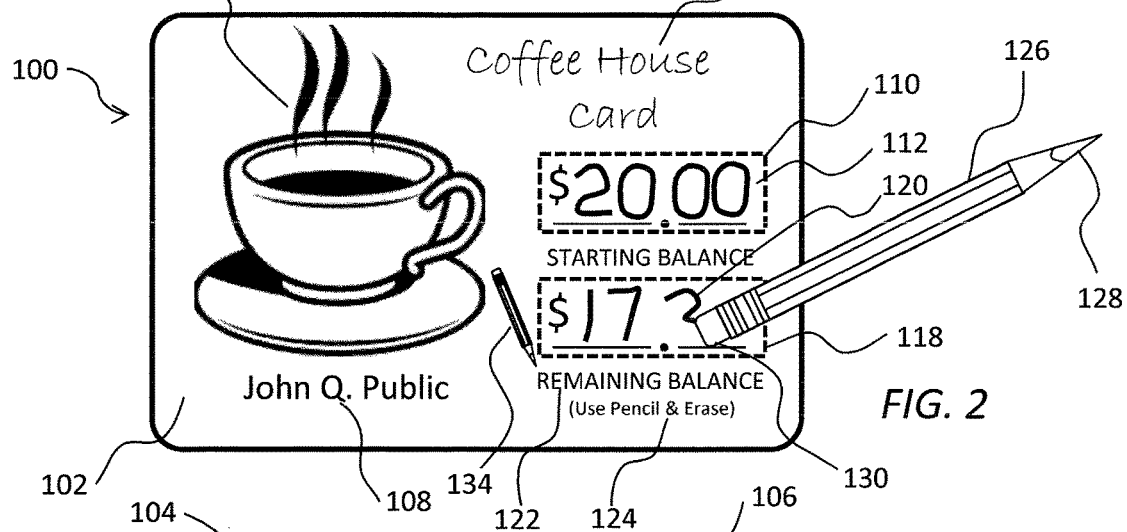
FIG. 2 is a front view of the gift card of the present invention shown in FIG. 1, showing the retailer's logo, the name of the customer, a starting balance data field, a remaining balance data field, and showing the remaining balance being erased from the data field.
Figure 3:
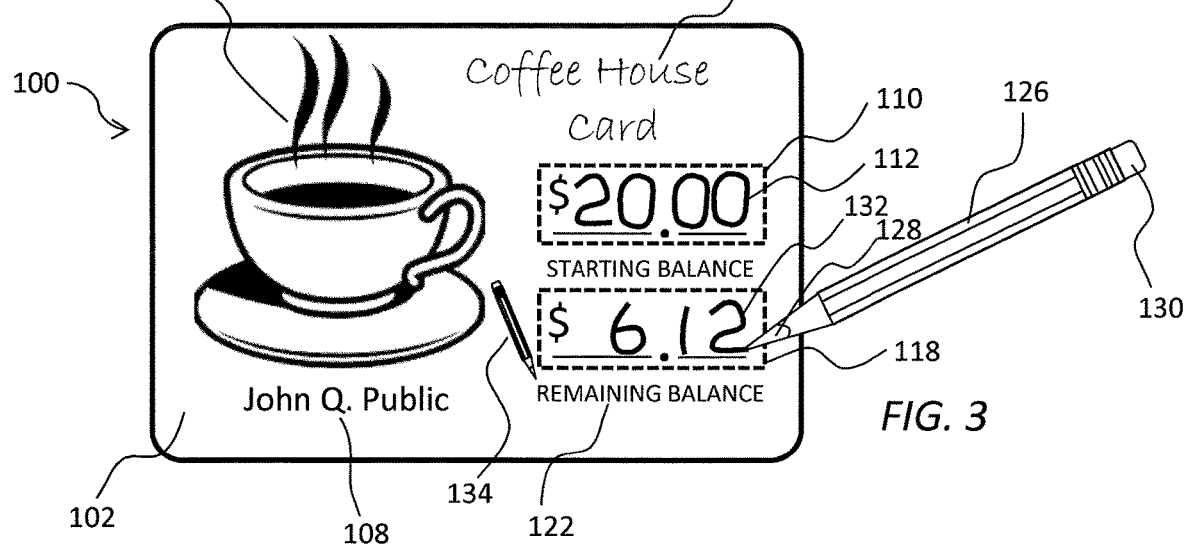
FIG. 3 is a front view of the gift card of the present invention shown in FIGS. 1 and 2, and showing the retailer's logo, the name of the customer, a starting balance data field, a remaining balance data field, and showing the remaining balance being updated in the data field.

Referring now to FIG. 2, a front view of the gift card of the present invention 100 as shown in FIG. 1 depicts the remaining balance 120 being erased from the data field 118 using eraser 130 of pencil 126. Referring to FIG. 3, the front view of the gift card 100 shows the remaining balance 132 being updated in the data field 118 using the lead 128 of pencil 126.

While a pencil 126 is depicted in FIGS. 1, 2, and 3, it is to be appreciated that other erasable writing instruments may be used without departing from the present invention, including but not limited to erasable pens. The data fields on gift card 100, such as data fields 110 and 118, are coated with a material suitable for writing and erasing, such as a an opaque coating capable of receiving a pencil marking and retaining it until erased. Various materials may be suitable, including but not limited to, textured polymer, paper coatings, ground cellulose. Alternatively, card 100 may be textured in the data field, such as by partial surface ablation, to receive an erasable marking device, such as a pencil.

Figure 4:
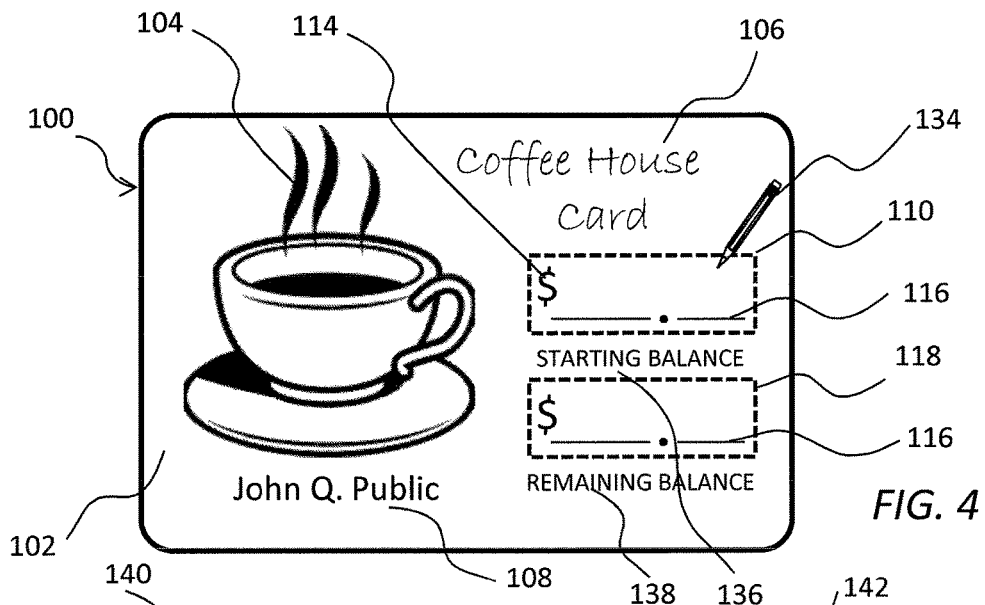
FIG. 4 is a front view of an alternative embodiment of the gift card of the present invention showing a user-fillable starting balance data field, a user-fillable remaining balance data field, and showing the retailer's logo and customer name.

FIG. 4 is a front view of a blank gift card 100 of the present invention as it would be provided by an exemplary retailer to its customers. For example, card 100 includes starting balance data field 110 and remaining balance data field 118 each printed with a pre-printed currency indicator 114 and data lines 116 to facilitate the user's entry of the balance data. Typically, a gift card will be purchased for a specific currency amount, and the data will be entered in field 110. Once the gift card 100 has been used, the remaining balance data field 118 may be completed to provide the user with the current balance available on the card without having to refer to a recent receipt, for example. Also shown in FIG. 4, card 100 is also shown with a user graphic prompt, such as pencil 134 which graphically instructs the user to complete the data field with a pencil to facilitate erasure and re-use. Also, text prompts 136 and 138 are used to provide prompts to complete the starting balance and remaining balance data fields.

Currency indicator 114 is shown to reflect United States Dollars. It should be appreciated, however, that any currency can be used in conjunction with the present invention. Indeed, for example and in no way limiting, Euros (€), Pounds (£), Yen (¥), and Internet based currency, such as bitcoins, can all be used in conjunction with the present invention. Accordingly, currency indicator 114 can be printed to reflect the specific currency being used.

Figure 5:
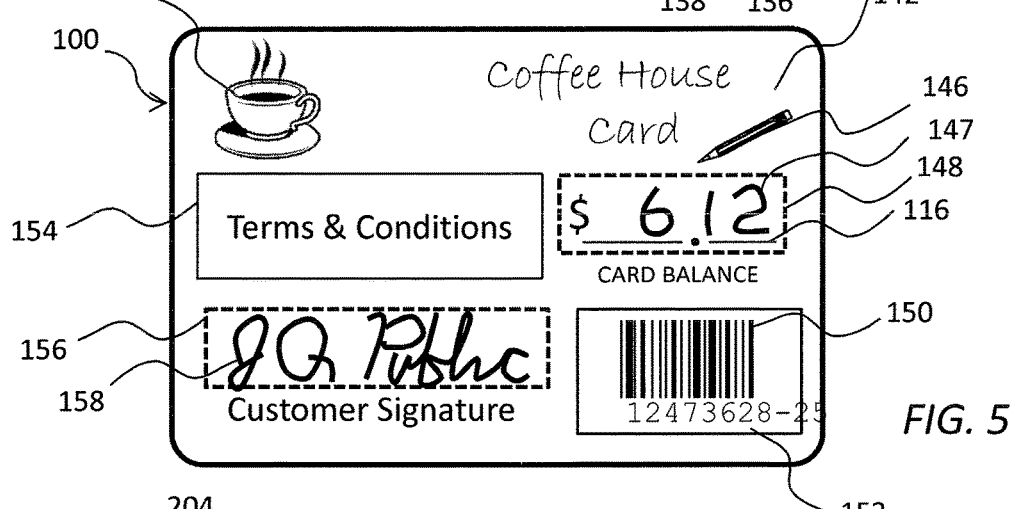
FIG. 5 is a back view of the gift card shown in FIG. 4, and shows the retailer's logo, a customer signature data field, a remaining balance data field, and card-identifying data, such as a bar code and serial number used to identify the particular gift card for tracking balances on the card account.

Referring now to FIG. 5 a back view of an exemplary embodiment of the gift card 100 shown in FIG. 4 is shown. FIG. 5 shows the retailer's logo 140, and the retailer's name 142. A card balance data field 148 with a user-written balance 147 is shown positioned on dollar and cents indicator 116. Instructions for completion of the data field 148 may include a representative graphic 146, such as a pencil, and instructions 124, such as "(Use Pencil & Erase)". Other equivalent instructions can be used without departing from the present invention.

Card 100 may also include a customer signature data field 156 for a customer's signature 158, and may be printed with various terms and conditions 154 for use and redemption of the card, along with other instructions or information. Additionally, card 100 may include card-identifying data, such as a bar code 150 and serial number 152 used to identify the particular gift card for tracking balances on the card account.

Figure 6:
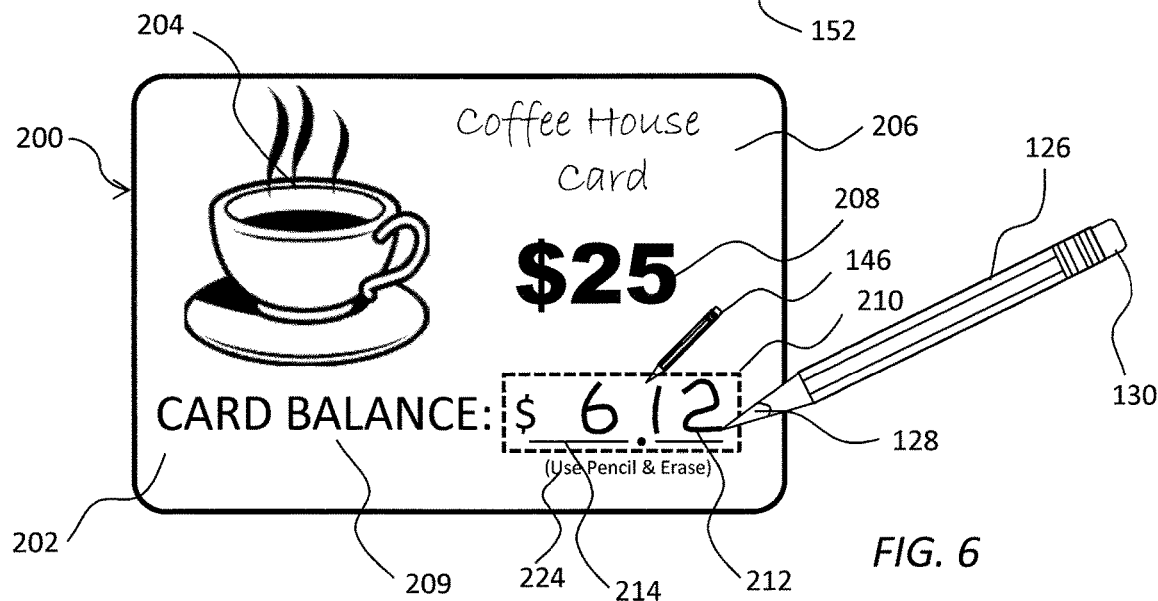
FIG. 6 is an alternative embodiment of the gift card of the present invention showing the retailer's logo, a pre-printed gift card account balance representing the balance on the card when initially purchased, and a user-fillable remaining balance data field being completed using an ordinary pencil.

Referring now to FIG. 6, an alternative embodiment of the gift card of the present invention is shown, generally referred to as 200, and includes a card body 202 having a retailer's logo 204, a retailer's name 206, a pre-printed gift card account balance 208 (which is optional depending on the retailers gift card program) representing the balance on the card when initially purchased, and a user-fillable Card Balance data field 210 being completed using an ordinary pencil 126, and identified with label 209, such as "Card balance". Card 200 also may be printed with a representative graphic 146 which will provide a user with sufficient instruction to use the re-writable functionality of the present invention. Dollar and cents indicator 214 allows a user to write the balance 212 clearly and accurately, as shown using pencil 126. A text prompt 224, such as "(Use Pencil & Erase)" may be used to provide a visual prompt to a user as to how to complete the data fields 210.

Reloadable Prepaid Credit Card

Figure 7:
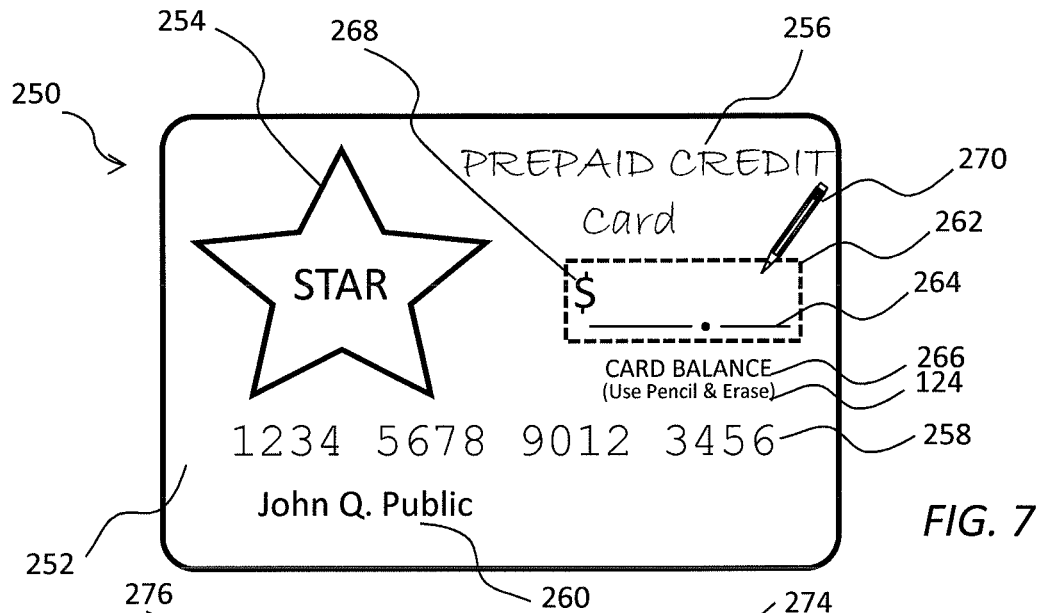
FIG. 7 is an alternative embodiment of the gift card of the present invention and depicting a reloadable pre-paid credit card having an account number, and with an erasable and user-fillable card balance field.

Referring now to FIG. 7, an alternative embodiment of the gift card of the present invention is shown as a reloadable pre-paid credit card generally designated 250. Prepaid credit card 250 includes a card body 252 which is printed with a card logo 254 and a card type identifier 256, such as "Prepaid Credit Card." Card 250 also includes a card balance data field 262 with a currency indicator 268, a pre-printed dollars and cents indicator 264, and a graphical indicator of a pencil 270 providing graphic instruction to the user. Additionally, card 250 may include a written prompt, such as "Card Balance" 266 and "(Use Pencil & Erase)" 124 which further prompt the user to complete the data field 262.

In an alternative embodiment, the prepaid credit card 250 also includes a customer's name 260, and a unique account number 258.

Figure 8:
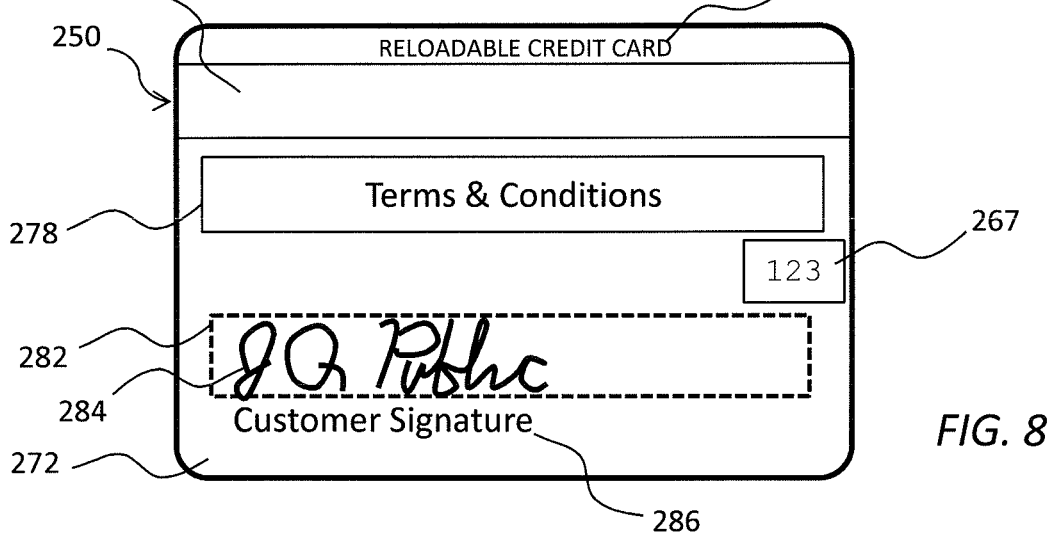
FIG. 8 is a back view of the reloadable pre-paid credit card shown in FIG. 7, and including a notice that the card is reloadable and also includes a magnetic encoding strip, terms and conditions, a credit card verification code, and a signature field for the user's permanent signature.

FIG. 8 is a back view of the gift card 250 shown in FIG. 7, and includes a notice 274 that the card is reloadable and also includes a magnetic encoding strip 276, terms and conditions 278, a credit card verification code 267, and a signature field 282 for the user's permanent signature 284 identified with label 286.

As shown in this Figure, the features of the reloadable gift card 250 of the present invention provides a user the ability to purchase or receive a gift card, and readily track the card balance as it is being used. This solution provides a simple, efficient and very usable method of tracking the balance of a gift or prepaid credit card thereby eliminating the embarrassment and hassle associated with attempting to use a card with an insufficient balance available.

The various embodiments shown and described herein are merely exemplary embodiments of the present invention and the particular combination of one feature with another are merely for discussion purposes, and such combinations are not intended to be limiting. The present invention contemplates the selective combination of each feature described herein as the present invention, and the omission of one or more feature from a particular embodiment is not intended to be a limitation on the scope or breadth of the present invention.

System Level Block Diagram

Figure 9:
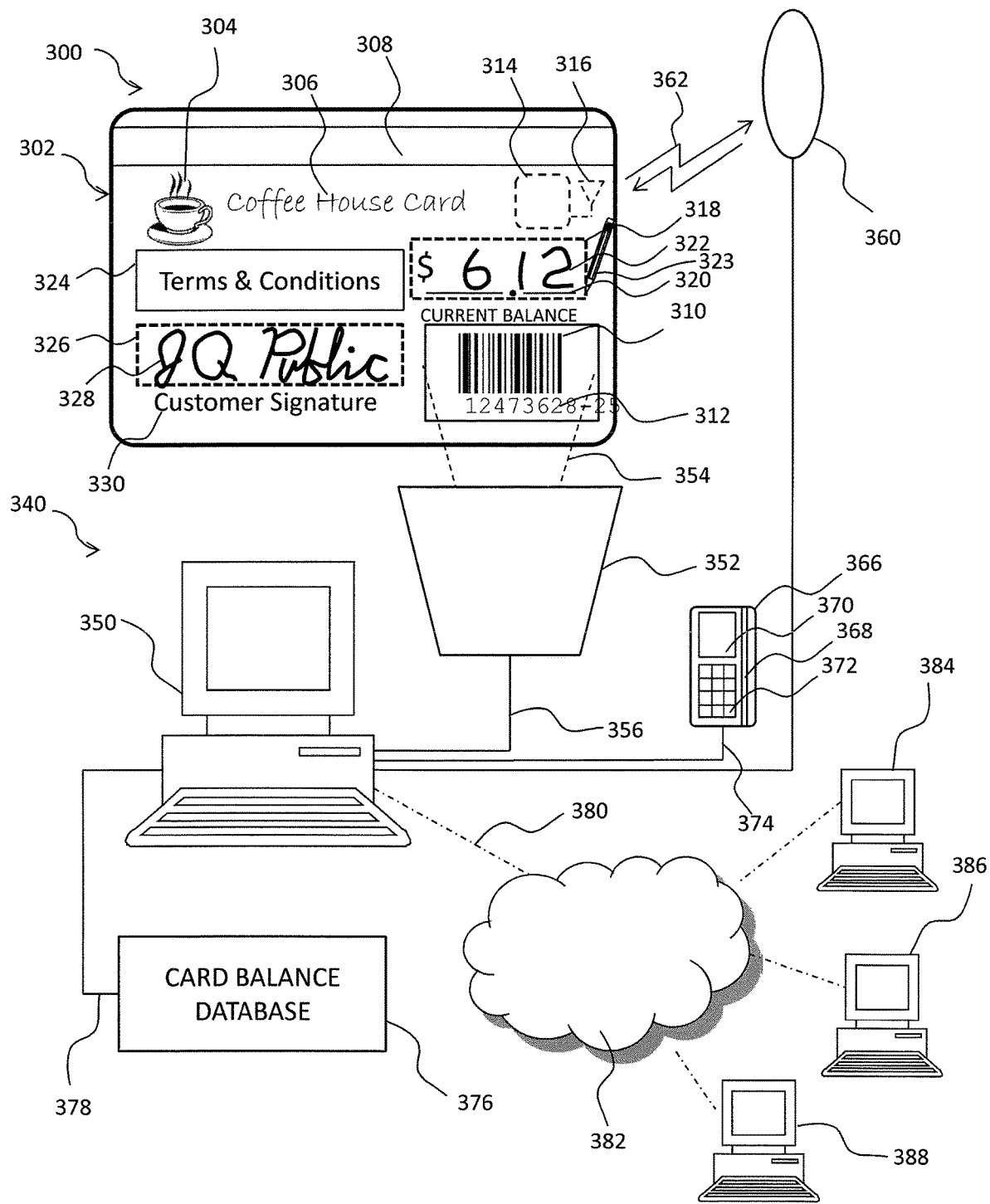
FIG. 9 is a system level drawing showing the back of a gift card of the present invention and showing a bar code reader scanning the bar code and serial number, an embedded radio frequency identification (RFID) tag corresponding with a radio signal generator and receiver to receive data for that particular gift card, a magnetic stripe card reader, and showing a computer receiving the bar code scanned data, RFID data, magnetic stripe reader data and having access to a card balance database, and access to a data network, such as the Internet, through which the card balance database is shared with other computer systems.

Referring now to FIG. 9 a system level drawing showing a typical application using the gift card of the present invention is shown and generally designated 300. System 300 includes a gift card 302 of the present invention, and a computer system 340 having a card balance database and associated card reading equipment. Specifically, a gift card 300 of the present invention includes a retailer logo 304 and name 306.

A card-specific bar code 310 and a unique card number 312 may be provided to allow retailers to track the specific cards, and the currency balance associated therewith. A radio frequency identification ("RFID") tag 314 with an associated antenna 316 may be embedded in the card 302, as is known in the art, to provide radio frequency communication between the card 300 and associated readers.

Card 302 can also be printed with terms and conditions 306, along with a customer signature data field 326 for a customer signature 328, and may have a name field indicator 330 to prompt a user's proper completion of the card. A current balance data field 318 is also provided for a user to write a current balance 322 in the pre-printed currency, dollar and cents field 320. A graphic 323, such as a pencil, can be shown to instruct the user on the proper writing instrument to use in conjunction with card 302.

Computer system 340 includes a computer 350 having a central processing unit, monitor and a keyboard as is known in the art. Attached to computer 350 is a bar code scanner 352 which projects a laser in field of view 354 that is reflected by bar code 310 for decoding to determine the bar code of the card 302. The card-identifying data is transmitted from bar code scanner 352 to computer 350 via interface 356, such as a wired or wireless interface.

A radio frequency identification emitter and detector 360 is provided which emits and receives radio frequency signals 362 from embedded radio frequency identification device 314 through antenna 316 within card 302. Card-identifying data is transmitted from card 302 through RFID device 314 and antenna 316 to RFID receiver 360 as is known in the art, and then transmitted via interface 364 to computer 350.

A magnetic stripe card reader 366 may also be provided in system 300. Specifically, magnetic stripe card reader 366 includes a card slot 368 through which magnetic strip 308 of card 302 is passed, and may be equipped with a display 370 and a keypad 372 that can be used by the retailer to input the transaction amount, or may be used by the user to input a security code, for example. Card-identifying data is transmitted from card reader 366 through interface 374 to computer 350.

In use, computer 350 receives the bar code scanned data from scanner 352, RFID data from RFID receiver 360, and magnetic stripe data from reader 366. This data is specific to the card 302 being used. Computer 350 also includes a card balance database 376 accessible through interface 378 which provides computer 350 access to the card balance for the specific card 302.

Computer 350 also includes access via communication link 380 to a data network 382, such as the Internet, through which the card balance database is shared with other computer systems 384, 386, and 388. During use, the various retailers computer 350, 384, 386, and 388 can access the card balance database 376, and provide a verification of available funds to a retailer during use. The user can then be informed either orally or through a receipt, of the remaining balance, and the user can then write the card balance directly on the card.

Method of Operation

Figure 10:
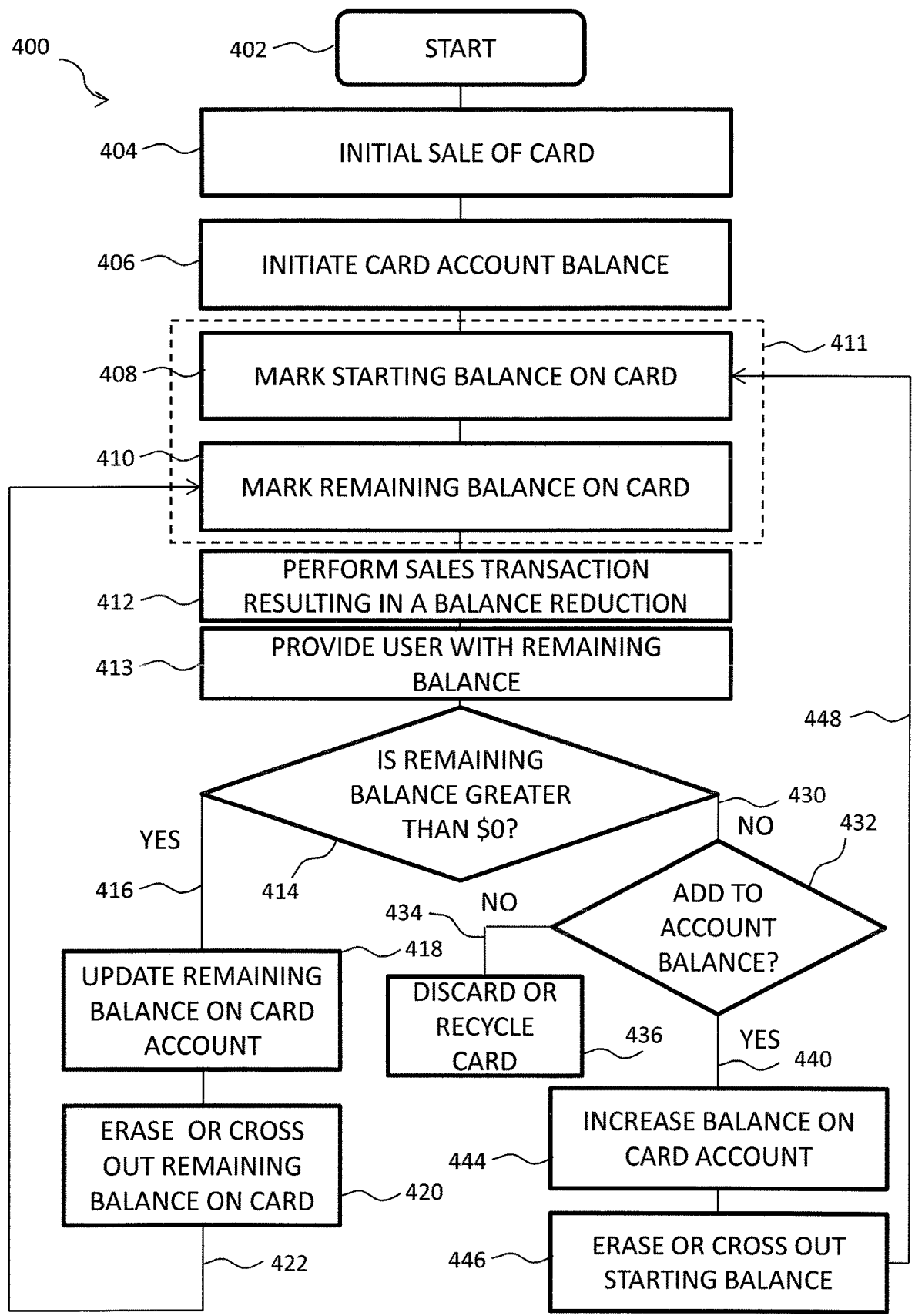
FIG. 10 is a flow chart showing the operation of the system of FIG. 7 and the gift cards of the present invention, and showing the process for initializing the gift card, tracking transactions resulting in reductions in the account balance for the gift card, updating the gift card balance, and marking the updated balance on the card, and increasing the card balance as desired.

FIG. 10 is a flow chart generally designated 400 and showing the operation of the system of FIG. 7 and the gift cards of the present invention, and showing the process for initializing the gift card, tracking transactions resulting in reductions in the account balance for the gift card, updating the gift card balance, and marking the updated balance on the card, and increasing the card balance as desired. More specifically, method 400 begins in step 402, and proceeds to step 404 in which the card is initially sold. This transaction typically will include the payment of a sum for the card, and may in some cases include a charge for the cost of the card. In either case, the card will be uniquely identified with a particular account balance which is initiated in step 406 and the card balance database is updated to reflect the starting balance.

Once the initial card balance is identified, either through payment of a specific fee or deposit of any sum, and the starting balance field of the card is marked with the starting balance in step 408. This marking is accomplished using the specific features of the re-writable data fields as described elsewhere herein. In some cases, the card will have a data field corresponding to the remaining balance available to that card through the card balance database, and that remaining balance may be marked on the card in step 410. It is to be appreciated that steps 408 and 410 may be combined in some embodiments of the present invention where there is a single data field for the card balance, and the card balance can be written on the card when the card is first purchased, and then that same data field can be rewritten with each subsequent transaction, as collectively shown in step 411 (shown in dashed lines).

Once the card is updated with the remaining balance on the card, a sales transaction is performed in step 412, which results in a balance reduction on the card balance database associated with that specific card.

Method 400 determines in step 414 whether the card balance is greater than zero, and if so, method 400 advances along line 416 to update the remaining balance on the card in step 418, and the outdated remaining balance written in the remaining balance data field is erased in step 420. Once erasure is complete, method 400 returns via line 422 to step 410 in which the remaining balance is marked on the card.

If in step 414 it is determined that the balance remaining on the card is zero, the method 400 advances along line 430 to step 432 in which it is determined whether to add currency to the account balance. If no currency is to be added, method 400 advances along line 434 to step 436 where the card is discarded or recycled. If, on the other hand, currency is to be added in step 432, method 400 advances along line 440 to increase the balance on the card in step 444 and update the corresponding card balance database. Once the balance is updated in the database, the original starting balance is erased in step 446, and method 400 returns via line 448 to step 408 where the starting balance is marked on the card.

Using this method, the gift card of the present invention may be used in perpetuity through the simple writing, erasure, and rewriting of the account balance on the card. Moreover, using the present invention, the ease in which the remaining balances on gift cards and prepaid credit cards can be managed is unmatched by currently available products.

The method steps presented herein are in a stepwise organization which is exemplary of a preferred embodiment. It is to be appreciated, however, that the method of the present invention may include additional steps, may omit steps presented, or such steps may be reorganized in a different order without departing from the spirit and scope of the present invention.

Additional Alternative Embodiments

Figure 11:
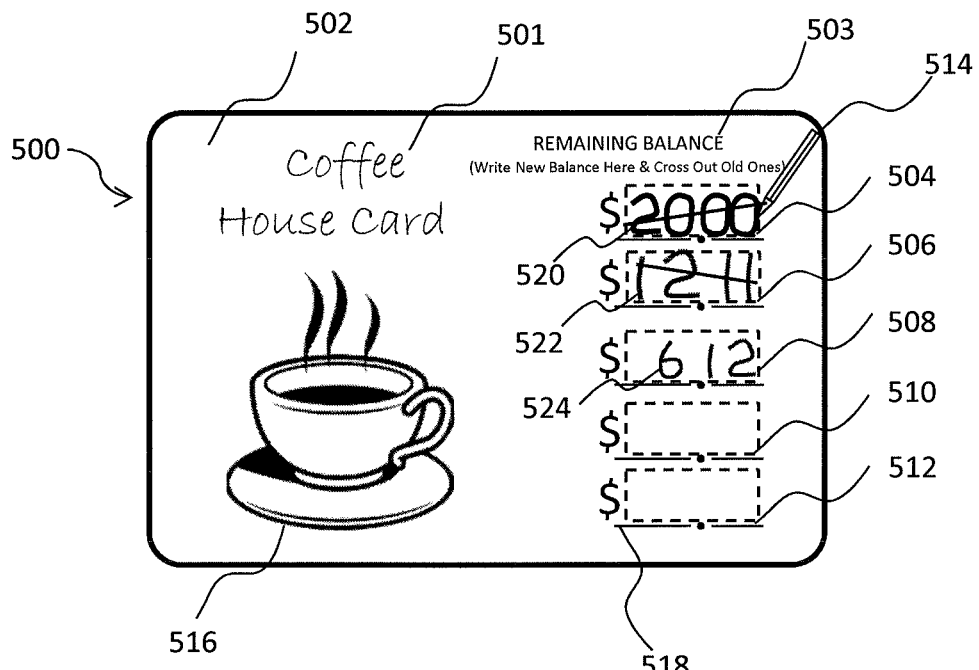
FIG. 11 is a front view of an alternative embodiment of the gift card of the present invention showing a vertical array of user-fillable data fields having a pen or pencil receptive coating, with a user-fillable starting balance field and a number of user-fillable remaining balance data fields, and showing the retailer's logo.

Referring now to FIG. 11, a front view of an alternative embodiment of the gift card of the present invention is shown and generally designated 500. Gift card 500 includes a card body 502 printed with a customer logo or design 516 and card name 501 indicating the source of the card, such as "Coffee House Card". In addition, the gift card may be personalized with the customer's personal name (not shown). A text prompt 503, such as "Remaining Balance (Write Balance here & Cross Out Old Ones)" may be used to provide a visual prompt to users on how to use the product.

Gift card 500 has a vertical array of user-fillable data fields 504-512 having a pen or pencil receptive coating. The user-fillable data fields 504-512 are located on the right side of the card body 502 in a vertical array. Although the user-fillable data fields 504-512 are shown in FIG. 11 as located on the right side of the card body 502, the number of user-fillable data fields may be more or less, and the user-fillable data fields 504-512 may be located anywhere on card body 502. An alternative method of arranging the user-fillable data fields 504-512 is shown in FIG. 12 and FIG. 13.

Gift card 500 includes a user-fillable starting balance field 504, having a pen or pencil receptive coating to allow the person giving or receiving gift card 500 to write the starting balance 520 on the gift card 500. The user may write the starting balance 520 in the user-fillable starting balance field 504 using a pen or pencil as indicated by the representative graphic 514, which depicts a pen. Dollar and cents indicator 518 allows a user to write the balance clearly and accurately. Below the user-fillable starting balance field 504 are a number of user-fillable remaining balance data fields 506-512. When the user of the gift card 500 completes a transaction, he or she may cross out the starting balance 520 in the user-fillable starting balance field 504 and write the new balance 522 in the subsequent first user-fillable remaining balance data field 506. When the user completes a second transaction with gift card 500, he or she may cross out the new balance 522 in the first user-fillable remaining balance data field 506 and write the subsequent balance 524 in the second user-fillable remaining balance data field 508. The same process repeats for the third user-fillable remaining balance data field 510 and the forth user-fillable remaining balance data field 512. Although four (4) user-fillable remaining balance data fields 506-512 are shown in FIG. 11, any number of balance data fields may be used. In addition, if more than four (4) transactions occur, the user may erase the balances written in the user fillable data fields 504-512 and continue to write in the balance until the amount on gift card 500 is depleted.

While the representative graphic 514 in FIG. 11 is depicted as a pencil, it is to be appreciated that other erasable writing instruments may be used without departing from the present invention, including but not limited to erasable pens. The data fields on gift card 500, such as data fields 504-512, are coated with a material suitable for writing and erasing, such as a an opaque coating capable of receiving a pencil marking and retaining it until erased. Various materials may be suitable, including but not limited to, textured polymer, paper coatings, ground cellulose. Alternatively, gift card 500 may be textured in the data field, such as by partial surface ablation, to receive an erasable marking device, such as a pencil.

Figure 12:
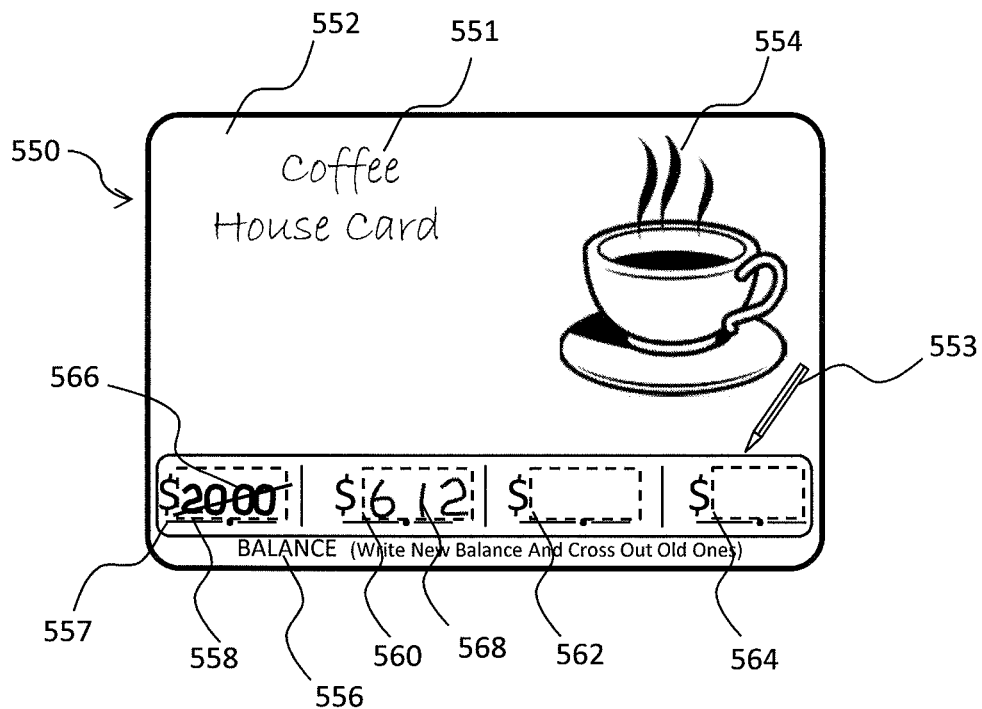
FIG. 12 is a front view of an alternative embodiment of the gift card of the present invention showing a horizontal array of user-fillable data fields having a pen or pencil receptive coating, with a user-fillable starting balance field and a number of user-fillable remaining balance data fields, instructions for use, and showing the retailer's name and logo.
Figure 13:
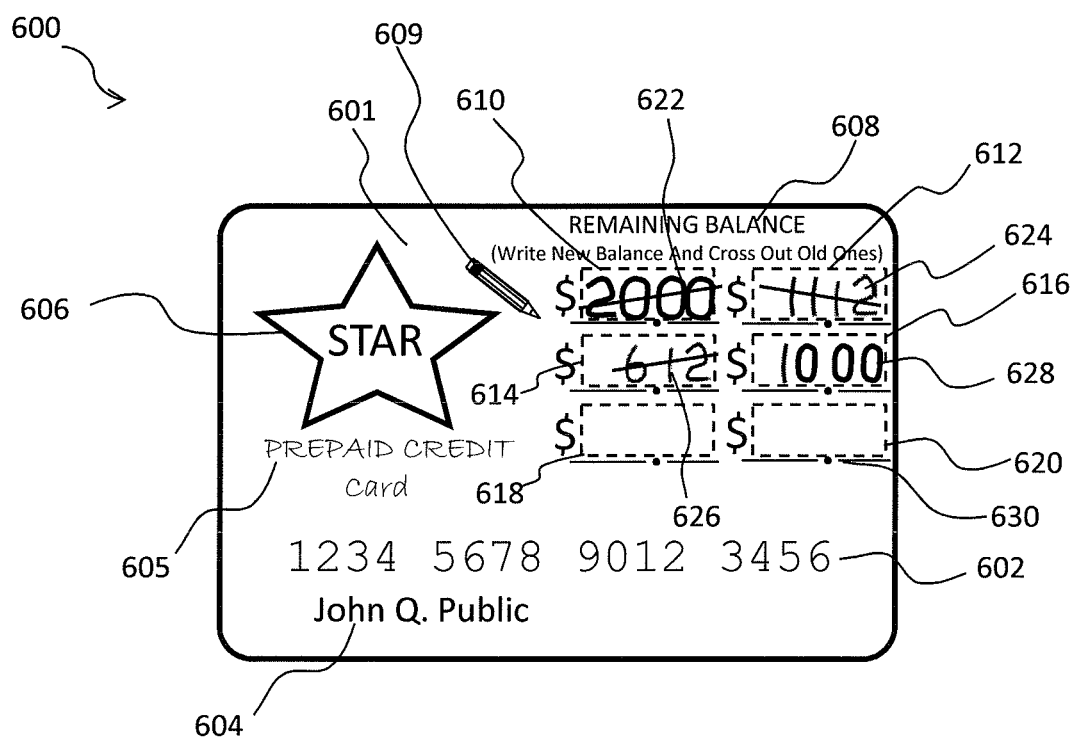
FIG. 13 is an alternative embodiment of the gift card of the present invention and depicting a reloadable pre-paid credit card having an account number and customer name, and having an array of user-fillable data fields having a pen or pencil receptive coating, with a user-fillable starting balance field and a number of user-fillable remaining balance data fields, instructions for use, and showing the retailer's name and logo.

FIG. 12 is a front view of an alternative embodiment of the gift card of the present invention and generally designated 550. Gift card 500 includes a card body 552 printed with a customer logo or design 554 and card name 551 indicating the source of the card, such as "Coffee House Card". In addition, the gift card may be personalized with the customer's personal name (not shown). A text prompt 556, such as "Remaining Balance (Write New Balance And Cross Out Old Ones)" may be used to provide a visual prompt to users on how to use the product.

Gift card 550 has a horizontal array of user-fillable data fields 558-564 having a pen or pencil receptive coating. The user-fillable data fields 558-564 are located on the bottom of the card body 552 in a horizontal array. As stated above, the user fillable data fields 558-564 may be located anywhere on the card body 552. Gift card 550 includes a user-fillable starting balance field 558 and a number of user-fillable remaining balance data fields 560-564. The user-fillable starting balance field 558 allows the person giving or receiving gift card 550 to write the starting balance 566 on the gift card 550. The user may write the starting balance 566 in the user-fillable starting balance field 558 using a pen or pencil as indicated by the representative graphic 553, which depicts a pencil. Dollar and cents indicator 557 allows a user to write the balance clearly and accurately.

Adjacent to the user-fillable starting balance field 558 are a plurality of user-fillable remaining balance data fields 560-564. When the user of the gift card 550 completes a transaction, he or she may cross out the starting balance 556 in the user-fillable starting balance field 558 and write the new balance 568 in the first user-fillable remaining balance data field 560. When the user completes a second transaction with gift card 550, he or she may cross out the new balance 568 in the first user-fillable remaining balance data field 560 and write the subsequent balance (not shown) in the second user-fillable remaining balance data field 562. The same process repeats for the third user-fillable remaining balance data field 564. Although three (3) user-fillable remaining balance data fields 560-564 are shown in FIG. 12, any number of balance data fields may be used. In addition, if more than three (3) transactions occur, the user may erase the balances written in the user fillable data fields 560-564 and continue to write in the balance until the amount on gift card 550 is depleted.

While the representative graphic 553 in FIG. 12 is depicted as a pencil, it is to be appreciated that other erasable writing instruments may be used without departing from the present invention, including but not limited to erasable pens or non-erasable pens. The data fields on gift card 550, such as data fields 558-564, are coated with a material suitable for writing and erasing, such as a an opaque coating capable of receiving a pencil marking and retaining it until erased. Various materials may be suitable, including but not limited to, textured polymer, paper coatings, ground cellulose. Alternatively, gift card 550 may be textured in the data field, such as by partial surface ablation, to receive an erasable marking device, such as a pencil.

FIG. 13 is an alternative embodiment of the gift card of the present invention is shown and generally designated 600. FIG. 13 depicts a reloadable pre-paid credit card having an account number 602 and customer name 604 located on the card body 601 of gift card 600. Gift card 600 includes a customer logo or design 606 and card name 605 indicating the source of the card or describing the card, such as "Prepaid Credit Card". A text prompt 608, such as "Remaining Balance (Write New Balance And Cross Out Old Ones)" may be used to provide a visual prompt to users on how to use the product.

Gift card 600 has an array of user-fillable data fields 610-620 having a pen or pencil receptive coating. The user-fillable data fields 610-620 are located on the upper-right side of the card body 601 in 2×3 columns. Although the user-fillable data fields 610-620 are shown in FIG. 13 as located on the upper-right side of the card body 601, the user-fillable data fields 610-620 may be located anywhere on card body 601.

Gift card 600 includes a user-fillable starting balance field 610, having a pen or pencil receptive coating to allow the person giving or receiving gift card 600 to write the starting balance 622 on the gift card 600. The user may write the starting balance 622 in the user-fillable starting balance field 610 using a pen or pencil as indicated by the representative graphic 609, which depicts a pencil. Dollar and cents indicator 630 allows a user to write the balance clearly and accurately.

Adjacent to the user-fillable starting balance field 610 are a number of user-fillable remaining balance data fields 612-620. When the user of the gift card 600 completes a transaction, he or she may cross out the starting balance 522 in the user-fillable starting balance field 510 and write the new balance 624 in the first user-fillable remaining balance data field 612. When the user completes a second transaction with gift card 600, he or she may cross out the new balance 624 in the first user-fillable remaining balance data field 612 and write the subsequent balance 626 in the second user-fillable remaining balance data field 614. The same process repeats for the third user-fillable remaining balance data field 616 with balance 628, the forth user-fillable remaining balance data field 618, and the fifth user-fillable remaining balance data field 620. Although five (5) user-fillable remaining balance data fields 610-620 are shown in FIG. 13, any number of balance data fields may be used. In addition, if more than five (5) transactions occur, the user may erase the balances written in the user fillable data fields 610-620 and continue to write in the balance until the amount on gift card 600 is depleted. Alternatively, the user may return to the retailer to exchange the gift card 600 for a new card with blank user fillable data fields to continue to deplete the balance on the card.

While the representative graphic 609 in FIG. 13 is depicted as a pencil, it is to be appreciated that other erasable writing instruments may be used without departing from the present invention, including but not limited to erasable pens. The data fields on gift card 600, such as data fields 610-620, are coated with a material suitable for writing and erasing, such as a an opaque coating capable of receiving a pencil marking and retaining it until erased. Various materials may be suitable, including but not limited to, textured polymer, paper coatings, ground cellulose. Alternatively, gift card 600 may be textured in the data field, such as by partial surface ablation, to receive an erasable marking device, such as a pencil.

While there have been shown what are presently considered to be preferred embodiments of the present invention, it will be apparent to those skilled in the art that various changes and modifications can be made herein without departing from the scope and spirit of the invention.

I claim:

1. A gift card system, comprising:
    a gift card having a body, a unique identifier, an initial card balance data field having a writing surface and a currency indicator, a plurality of successive card balance data fields having a writing surface and a currency indicator, and a plurality of pre-printed prompts on said card body to prompt a user to complete said card balance data fields, said plurality of pre-printed prompts comprising a text prompt above said card balance data fields, a graphics prompt next to said card balance data fields, and a currency indicator next to each of said card balance data fields;
    a card balance database corresponding to said unique identifier;
    a computer system connected to a data network and having a central processing unit and access to said card balance database; and
    means to identify said unique identifier of said gift card, wherein said computer system is configured to send and receive database information with other computer systems via said data network, the database information containing at least a verification of available funds associated with the gift card.

2. The gift card system of claim 1, further comprising one or more pre-printed prompts on said card body to prompt a user to complete said initial and successive card balance data fields.

3. The gift card system of claim 1, wherein the initial card balance data field and the successive card balance data fields form an array of vertically stacked card balance data fields.

4. The gift card system of claim 1, wherein the initial card balance data field and the successive card balance data fields form a horizontal array of card balance data fields.

5. The gift card system of claim 1, wherein the initial card balance field and the successive card balance fields form an array of two columns by three rows consisting of the initial card balance field and five successive card balance fields.

6. The gift card system of claim 1, wherein the writing surface of the initial card balance field and each of the successive card balance fields comprises textured polymer.

7. The gift card system of claim 1, wherein the writing surface of the initial card balance field and each of the successive card balance fields comprises ground cellulose.

8. The gift card system of claim 1, wherein the writing surface of the initial card balance field and each of the successive card balance fields is formed by surface ablation.

9. The gift card system of claim 1, wherein the initial card balance data field and the successive card balance data fields form a vertical array of card balance data fields.

10. A gift card system, comprising:
    a gift card having a body, a unique identifier, an initial card balance data field having a writing surface and a currency indicator, a plurality of successive card balance data fields having a writing surface and a currency indicator, and a plurality of pre-printed prompts on said card body to prompt a user to complete said card balance data fields, said plurality of pre-printed prompts comprising a text prompt below said card balance data fields, a graphics prompt above said card balance data fields, and a currency indicator next to each of said card balance data fields;
    a card balance database corresponding to said unique identifier;
    a computer system connected to a data network and having a central processing unit and access to said card balance database; and
    means to identify said unique identifier of said gift card, wherein said computer system is configured to send and receive database information with other computer systems via said data network, the database information containing at least a verification of available funds associated with the gift card.

11. The gift card system of claim 10, wherein the initial card balance data field and the successive card balance data fields form a horizontal array of card balance data fields.

12. The gift card system of claim 10, wherein the writing surface of the initial card balance field and each of the successive card balance fields comprises textured polymer.

13. The gift card system of claim 10, wherein the writing surface of the initial card balance field and each of the successive card balance fields comprises ground cellulose.

14. The gift card system of claim 10, wherein the writing surface of the initial card balance field and each of the successive card balance fields is formed by surface ablation.

* * * * *